United States Patent
Jordan et al.

(10) Patent No.: US 7,593,429 B2
(45) Date of Patent: Sep. 22, 2009

(54) SYSTEM AND METHOD FOR TIME SYNCHRONIZING NODES IN AN AUTOMOTIVE NETWORK USING INPUT CAPTURE

(75) Inventors: Patrick D. Jordan, Austin, TX (US); Hai Dong, Austin, TX (US); Hugh W. Johnson, Cedar Park, TX (US); Prakash U. Kartha, Round Rock, TX (US)

(73) Assignee: Temic Automotive of North America, Inc., Deer Park, IL (US)

( * ) Notice: Subject to any disclaimer, the term of this patent is extended or adjusted under 35 U.S.C. 154(b) by 594 days.

(21) Appl. No.: 11/014,936

(22) Filed: Dec. 17, 2004

(65) Prior Publication Data

US 2006/0083264 A1    Apr. 20, 2006

Related U.S. Application Data

(60) Provisional application No. 60/618,769, filed on Oct. 14, 2004, provisional application No. 60/618,768, filed on Oct. 14, 2004.

(51) Int. Cl.
    *H04J 3/06*    (2006.01)
(52) U.S. Cl. ..................................... 370/503
(58) Field of Classification Search ................. 370/359, 370/503, 509, 510, 511, 512, 513, 514, 516; 375/354, 356, 364–366, 371
See application file for complete search history.

(56) References Cited

U.S. PATENT DOCUMENTS

| | | |
|---|---|---|
| 4,816,989 A | 3/1989 | Finn et al. |
| 5,151,899 A | 9/1992 | Thomas et al. |
| 5,195,091 A | 3/1993 | Farwell |
| 5,321,689 A | 6/1994 | Suzuki et al. |
| 5,566,180 A | 10/1996 | Eidson et al. |
| 5,612,953 A | 3/1997 | Olnowich |
| 5,802,052 A | 9/1998 | Venkataraman |
| 6,356,823 B1 | 3/2002 | Iannotti et al. |
| 6,373,834 B1 | 4/2002 | Lundh et al. |
| 6,420,797 B1 | 7/2002 | Steele |

(Continued)

OTHER PUBLICATIONS

D. John Oliver, Intel Corporation, "Implementing the J1850 Protocci", 15 pages, available from the Internet at http://developer.intel.com/design/intarch/papers/j1850_wp.pdf (per internet Archive Wayback Machine) Sep. 2000.

(Continued)

*Primary Examiner*—Ajit Patel

(57) ABSTRACT

A system and method for time synchronizing nodes in a switch fabric network of a vehicle. The network has a plurality of nodes that are joined by communication links for the transmission of data there between. Each node of the switch fabric may include a processor, a memory, a clock, a transceiver, and an input capture. The memory is adapted to store and retain timer offsets associated with communication links with neighboring nodes. The transceiver is adapted to transmit and receive synchronization messages between the node and neighboring nodes. The input capture is adapted to capture a timestamp associated with the transmission of synchronization messages. The processor is configured to compute the timer offsets associated with the communication links with neighboring nodes based on the captured timestamps by the input capture function. The computed offsets may then be broadcast and stored by the nodes for subsequent use in time synchronizing data packets through the switch fabric network.

22 Claims, 7 Drawing Sheets

U.S. PATENT DOCUMENTS

| | | | |
|---|---|---|---|
| 6,430,164 B1 | 8/2002 | Jones et al. | |
| 6,477,453 B2 | 11/2002 | Oi et al. | |
| 6,559,783 B1 | 5/2003 | Stoneking | |
| 6,611,519 B1 | 8/2003 | Howe | |
| 6,611,537 B1 | 8/2003 | Edens et al. | |
| 6,643,465 B1 | 11/2003 | Bösinger et al. | |
| 6,732,031 B1 | 5/2004 | Lightner et al. | |
| 6,747,365 B2 | 6/2004 | Reinold | |
| 6,757,521 B1 | 6/2004 | Ying | |
| 6,845,416 B1 | 1/2005 | Chasmawala et al. | |
| 7,027,773 B1 * | 4/2006 | McMillin | 455/41.2 |
| 7,210,063 B2 | 4/2007 | Holcroft et al. | |
| 7,272,496 B2 | 9/2007 | Remboski et al. | |
| 2002/0077739 A1 | 6/2002 | Augsburger et al. | |
| 2002/0080829 A1 | 6/2002 | Ofek | |
| 2002/0087891 A1 | 7/2002 | Little et al. | |
| 2003/0043739 A1 | 3/2003 | Reinold et al. | |
| 2003/0043750 A1 | 3/2003 | Remboski et al. | |
| 2003/0043779 A1 | 3/2003 | Remboski et al. | |
| 2003/0043793 A1 | 3/2003 | Reinold et al. | |
| 2003/0043799 A1 | 3/2003 | Reinold et al. | |
| 2003/0043824 A1 | 3/2003 | Remboski et al. | |
| 2003/0045234 A1 | 3/2003 | Remboski et al. | |
| 2003/0045971 A1 | 3/2003 | Reinold et al. | |
| 2003/0045972 A1 | 3/2003 | Remboski et al. | |
| 2003/0046327 A1 | 3/2003 | Reinold et al. | |
| 2003/0051131 A1 | 3/2003 | Reinold et al. | |
| 2003/0065630 A1 | 4/2003 | Brown et al. | |
| 2003/0091035 A1 | 5/2003 | Roy | |
| 2003/0185201 A1 | 10/2003 | Dorgan | |
| 2003/0188303 A1 | 10/2003 | Barman et al. | |
| 2004/0001593 A1 | 1/2004 | Reinold et al. | |
| 2004/0002799 A1 | 1/2004 | Dabbish et al. | |
| 2004/0003227 A1 | 1/2004 | Reinold et al. | |
| 2004/0003228 A1 | 1/2004 | Fehr et al. | |
| 2004/0003229 A1 | 1/2004 | Reinold et al. | |
| 2004/0003230 A1 | 1/2004 | Puhl et al. | |
| 2004/0003231 A1 | 1/2004 | Levenson et al. | |
| 2004/0003232 A1 | 1/2004 | Levenson et al. | |
| 2004/0003233 A1 | 1/2004 | Reinold et al. | |
| 2004/0003234 A1 | 1/2004 | Reinold et al. | |
| 2004/0003237 A1 | 1/2004 | Puhl et al. | |
| 2004/0003242 A1 | 1/2004 | Fehr et al. | |
| 2004/0003243 A1 | 1/2004 | Fehr et al. | |
| 2004/0003245 A1 | 1/2004 | Dabbish et al. | |
| 2004/0003249 A1 | 1/2004 | Dabbish et al. | |
| 2004/0003252 A1 | 1/2004 | Dabbish et al. | |
| 2004/0042469 A1 | 3/2004 | Clark et al. | |
| 2004/0131014 A1 | 7/2004 | Thompson, III et al. | |
| 2004/0148460 A1 | 7/2004 | Steinmetz et al. | |
| 2004/0213295 A1 | 10/2004 | Fehr | |
| 2004/0227402 A1 | 11/2004 | Fehr et al. | |
| 2004/0254700 A1 | 12/2004 | Fehr et al. | |
| 2004/0258001 A1 | 12/2004 | Remboski et al. | |
| 2005/0004727 A1 | 1/2005 | Remboski et al. | |
| 2005/0038583 A1 | 2/2005 | Fehr et al. | |
| 2005/0160285 A1 | 7/2005 | Evans | |
| 2005/0251604 A1 | 11/2005 | Gerig | |
| 2005/0251608 A1 | 11/2005 | Fehr et al. | |
| 2006/0013263 A1 * | 1/2006 | Fellman | 370/503 |
| 2006/0013565 A1 * | 1/2006 | Baumgartner | 386/96 |
| 2006/0020717 A1 | 1/2006 | Remboski et al. | |
| 2006/0083172 A1 | 4/2006 | Jordan et al. | |
| 2006/0083173 A1 | 4/2006 | Jordan et al. | |
| 2006/0083229 A1 | 4/2006 | Jordan et al. | |
| 2006/0083250 A1 | 4/2006 | Jordan et al. | |
| 2006/0083265 A1 | 4/2006 | Jordan et al. | |
| 2006/0282549 A1 | 12/2006 | Vinnemann | |

OTHER PUBLICATIONS

"Controller Area Network (CAN) - Protocol", copyright 2003 by CAN in Automation (CIA), 5 pages, available from the internet at http://www.can.cia.org/can/protocol/ (per Internet Archive Wayback Machine) May 2004.

* cited by examiner

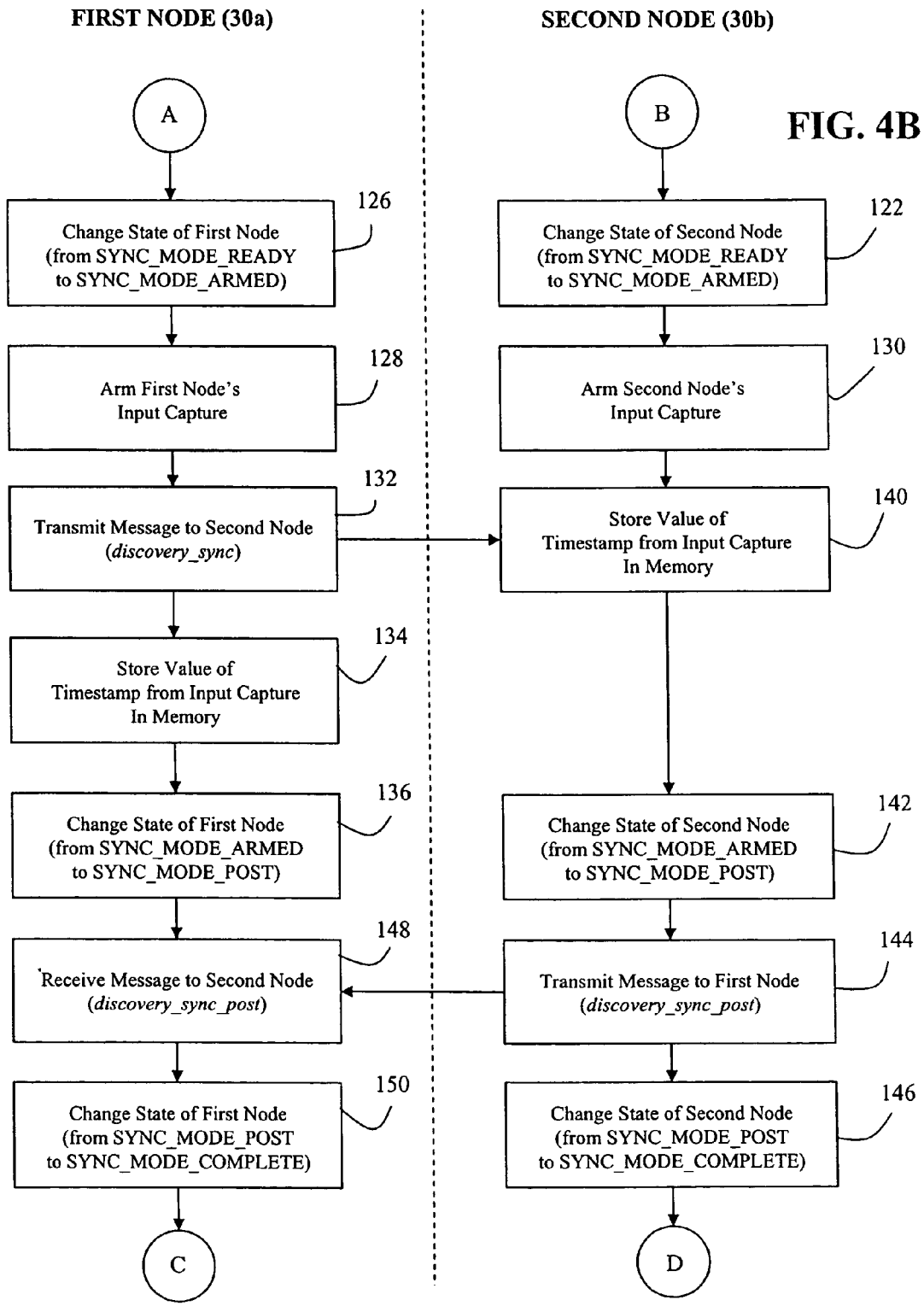

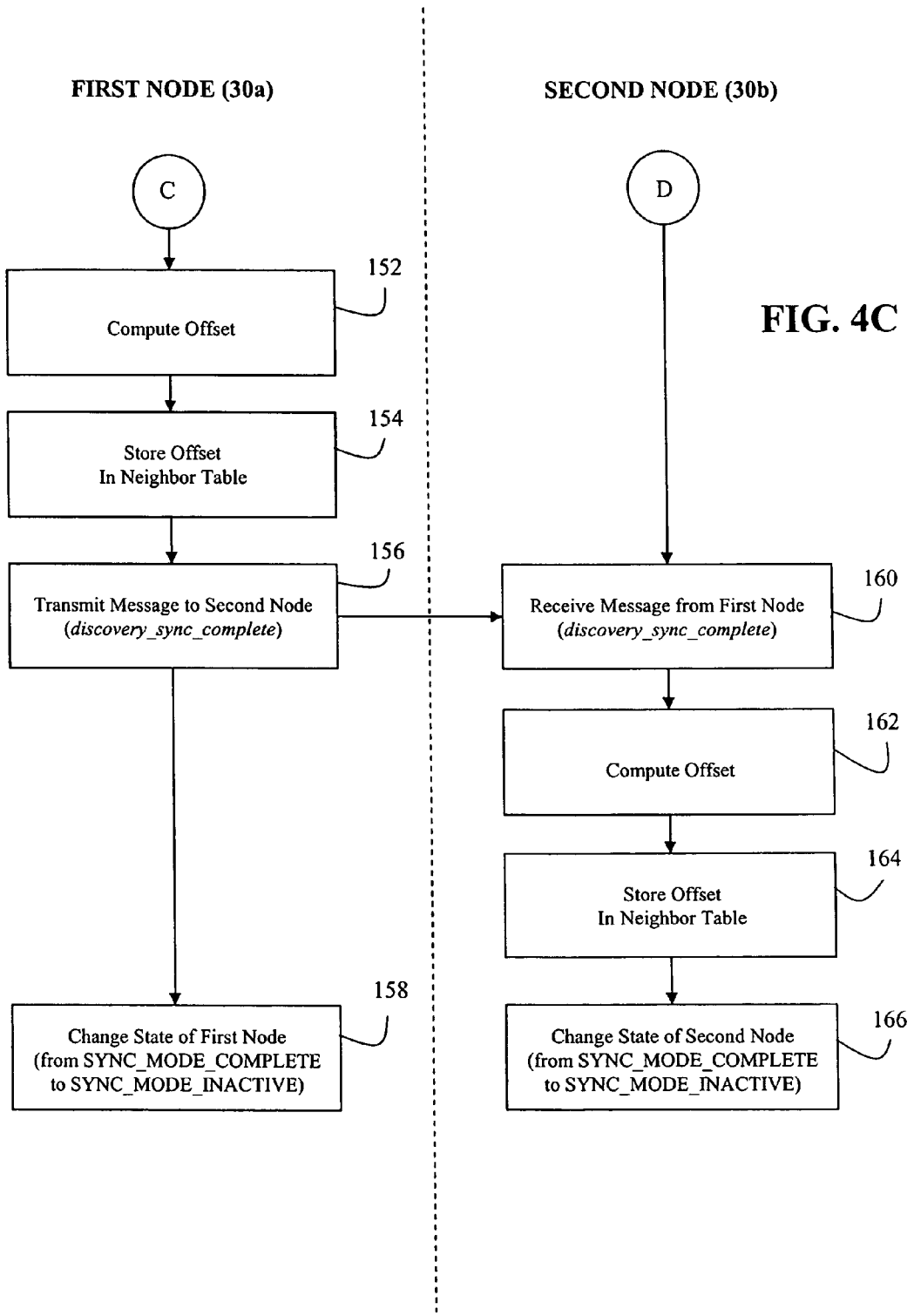

SYSTEM AND METHOD FOR TIME SYNCHRONIZING NODES IN AN AUTOMOTIVE NETWORK USING INPUT CAPTURE

The present application claims priority from provisional application Ser. No. 60/618,768, entitled "System and Method for Time Synchronizing Nodes in an Automotive Network Using Input Capture," filed Oct. 14, 2004, which is commonly owned and incorporated herein by reference in its entirety.

The present application is related to provisional application Ser. No. 60/618,769, entitled "System and Method for Time Synchronizing Nodes in an Automotive Network," filed Oct. 14, 2004, which is commonly owned and incorporated herein by reference in its entirety.

FIELD OF THE INVENTION

This invention in general relates to in-vehicle communication networks and particularly to a system and method for synchronizing nodes in an in-vehicle network using an input capture mechanism.

BACKGROUND OF THE INVENTION

The commonly assigned United States patent application entitled "Vehicle Active Network," Ser. No. 09/945,581, Publication No. US 20030043793, filed Aug. 31, 2001, the disclosure of which is hereby expressly incorporated herein by reference, introduces the concept of an active network that includes a switch fabric. The switch fabric is a web of interconnected switching devices or nodes. Control devices, sensors, actuators and the like are coupled to the switch fabric, and the switch fabric facilitates communication between these coupled devices.

The coupled devices may be indicator lights, vehicle control systems, vehicle safety systems, and comfort and convenience systems. A command to actuate a device or devices may be generated by a control element coupled to the switch fabric and is communicated to the device or devices via the switch fabric. The command may require simultaneous activation of two or more devices. However, the switch fabric may be a packet based communication medium making coordinating simultaneous events difficult.

To illustrate this difficulty take for example the need to capture data from multiple sensors at the same time. For example, it may be necessary to communicate various control parameters from a number of engine sensors to an engine controller so that it may then issue commands for the control of the engine. For example, to detect misfire, the engine controller receives data from several oxygen sensors, the crankshaft position sensor and potentially other sensors. To be certain that the misfire is detected for the correct engine cylinder so that control parameters may be varied to correct the misfire, the data must arrive to the engine controller in a coordinated manner or have a reliable time indication. Unless each of the sensors are time synchronized, there is no way to accurately time stamp the data packets or to effectively communicate them to the engine controller in a coordinated manner.

Another problem may involve the need for multiple devices to be activated at the same time or at a predefined time in the future. For example, there is a need to illuminate the left, right and center high-mounted brake lights on an automobile. Each of the brake lights should appear to illuminate substantially simultaneously. Each of the lights is coupled to the switch fabric. The command to illuminate the lights may be generated by a braking control module, which is also coupled to the switch fabric. The command is communicated from the braking control module to the three brake lights. However, the command may take different incremental amounts of time based upon the paths the command takes through the network to arrive at each of the three brake lights. If the brake lights act on the command when received, the lights may not appear to come on simultaneously. The command may give a time at which to activate, but if each of the brake lights are not time synchronized, they still will not actuate at the same coordinated time.

It is, therefore, desirable to provide a system and method to overcome or minimize most, if not all, of the preceding problems especially in the area of synchronizing elements of an in-vehicle network.

BRIEF DESCRIPTION OF THE DRAWINGS

FIGS. 4A-4C are flow diagrams illustrating one embodiment of a synchronization dialogue between two nodes;

Figure 1:
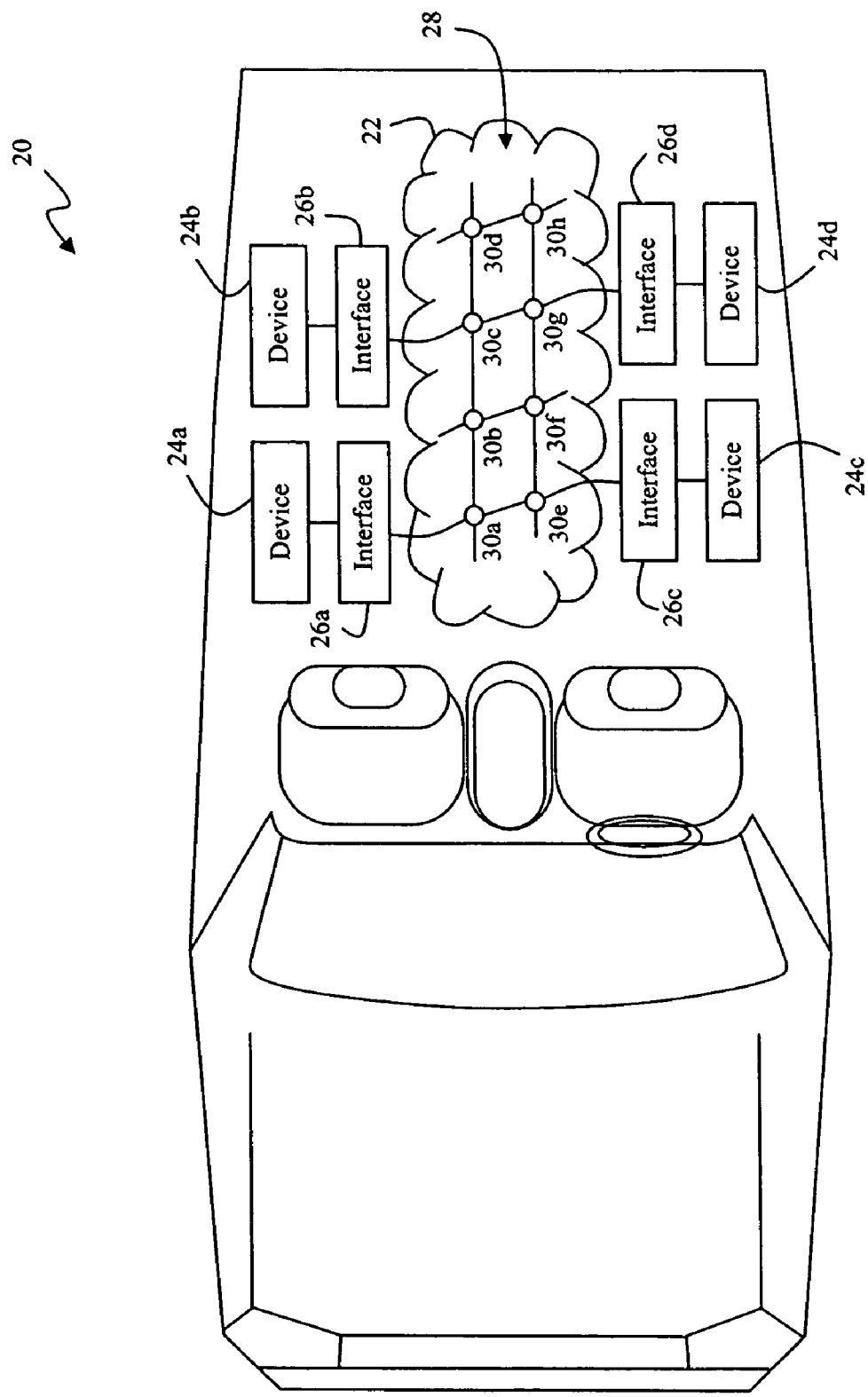
FIG. 1 is a block diagram illustrating an embodiment of a vehicle active network.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for time synchronizing nodes in a switch fabric network of a vehicle. The network has a plurality of nodes that are joined by communication links for the transmission of data there between. As explained in more detail below, each node of the switch fabric may include a processor, a memory, a clock, a transceiver, and an input capture. The memory is adapted to store and retain timer offsets associated with communication links with neighboring nodes. The transceiver is adapted to transmit and receive synchronization messages between the node and neighboring nodes. The input capture is adapted to capture timestamps associated with the transmission of synchronization messages. The processor is configured to compute the timer offsets associated with the communication links with neighboring nodes based on the captured timestamps by the input capture function. The computed offsets may then be broadcast and stored by the nodes for subsequent use in time synchronizing data packets through the switch fabric network.

Now, turning to the drawings, FIG. 1 illustrates a vehicle 20 including a network 22 to which various vehicle devices 24*a-d* are coupled via respective interfaces 26*a-d*. The vehicle devices 24*a-d* may be sensors, actuators, and processors used in connection with various vehicle functional systems and sub-systems, such as, but not limited to, diagnostics, control-by-wire applications for throttle, braking and steering control, adaptive suspension, power accessory control, communications, entertainment, and the like.

The interfaces 26a-d are any suitable interface for coupling the particular vehicle device 24a-d to the network 22, and may be wire, optical, wireless or combinations thereof. The vehicle device 24a-d is particularly adapted to provide one or more functions associated with the vehicle 20. These vehicle devices 24a-d may be data producing, such as a sensor, data consuming, such as an actuator, or processing, which both produces and consumes data. Of course, an actuator, typically a data-consuming device, may also produce data, for example where the actuator produces data indicating it has achieved the instructed state, or a sensor may consume data, for example, where it is provided instructions for the manner of function. Data produced by or provided to a vehicle device 24a-d, and carried by the network 22, is independent of the function of the vehicle device 24a-d itself. That is, the interfaces 26a-d provide device independent data exchange between the coupled device 24a-d and the network 22.

The network 22 may include a switch fabric 28 defining a plurality of communication paths between the vehicle devices 24a-d. The communication paths permit multiple simultaneous peer-to-peer, one-to-many, many-to-many, etc. communications between the vehicle devices 24a-d. During operation of the vehicle 20, data exchanged, for example, between devices 24a and 24d may utilize any available path or paths between the vehicle devices 24a, 24d. In operation, a single path through the switch fabric 28 may carry all of a single data communication between one vehicle device 24a and another vehicle device 24d, or several communication paths may carry portions of the data communication. Subsequent communications may use the same path or other paths as dictated by the then state of the network 22. This provides reliability and speed advantages over bus architectures that provide single communication paths between devices, and hence are subject to failure with failure of the single path. Moreover, communications between other of the devices 24b, 24c may occur simultaneously using the communication paths within the switch fabric 28.

The network 22 may comply with transmission control protocol/Internet (TCP/IP), asynchronous transfer mode (ATM), Infiniband, RapidIO, or other packet data protocols. As such, the network 22 utilizes data packets, having fixed or variable length, defined by the applicable protocol. For example, if the network 22 uses asynchronous transfer mode (ATM) communication protocol, ATM standard data cells are used.

The vehicle devices 24a-d need not be discrete devices. Instead, the devices may be systems or subsystems of the vehicle and may include one or more legacy communication media, i.e., legacy bus architectures such as the Controller Area Network (CAN) protocol, the SAE J1850 Communication Standard, the Local Interconnect Network (LIN) protocol, the FLEXRAY Communications System Standard, Media Oriented Systems Transport or MOST Protocol, or similar bus structures. In such embodiments, the respective interface 26a-d may be configured as a proxy or gateway to permit communication between the network 22 and the legacy device.

Figure 2:
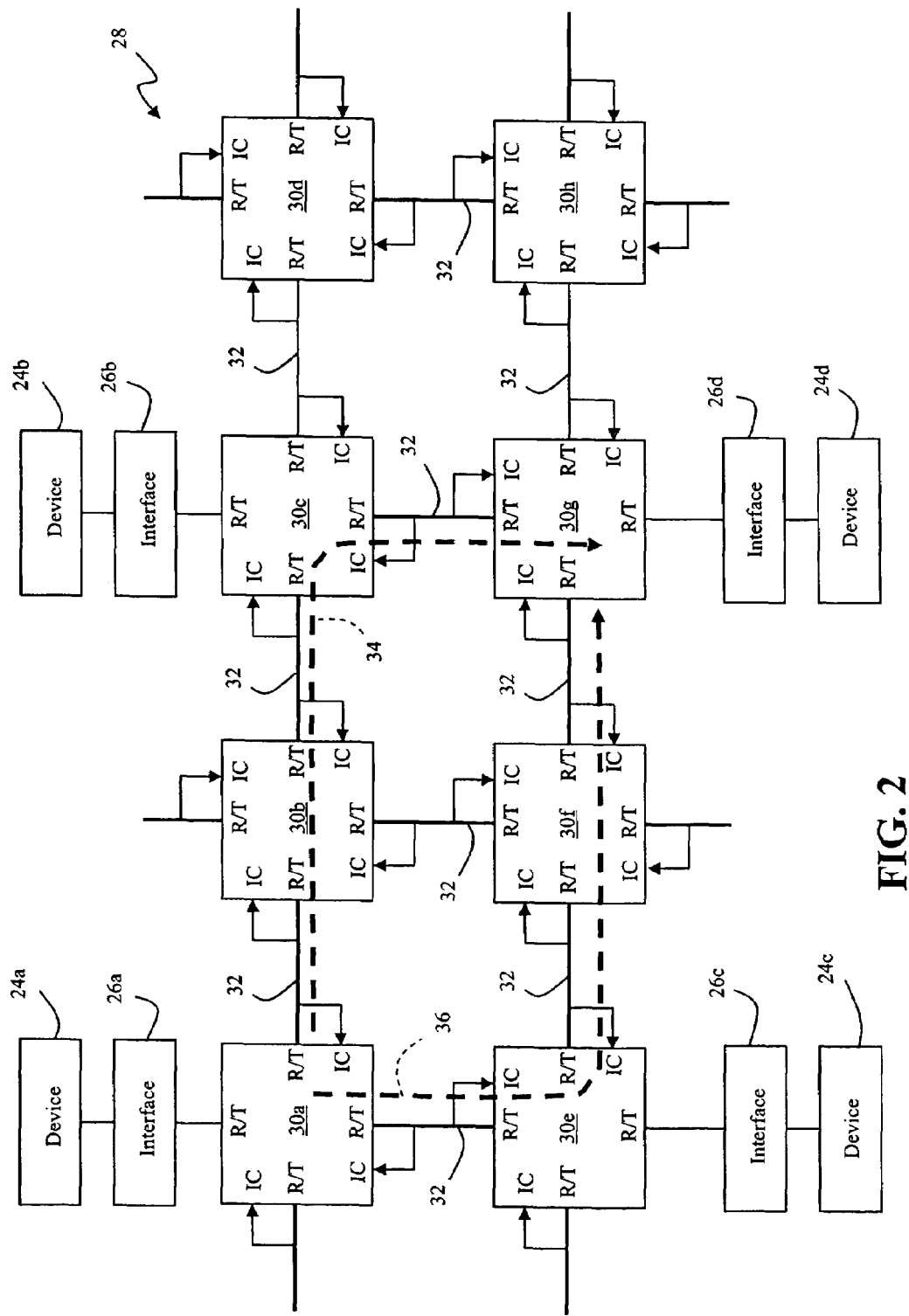
FIG. 2 is a graphic illustration of an embodiment of a vehicle switch fabric network according to the invention.

Referring to FIG. 2, an active network 22 in accordance with one embodiment of the present invention includes a switch fabric 28 of nodes 30a-h that communicatively couple a plurality of devices 24a-d via respective interfaces 26a-d. Connection media 32 interconnects the nodes 30a-h. The connection media 32 may be bounded media, such as wire or optical fiber, unbounded media, such as free optical or radio frequency, or combinations thereof. In addition, the term node is used broadly in connection with the definition of the switch fabric 28 to include any number of intelligent structures for communicating data packets within the network 22 without an arbiter or other network controller and may include: switches, intelligent switches, routers, bridges, gateways and the like. Data is thus carried through the network 22 in data packet form guided by the nodes 30a-h.

The cooperation of the nodes 30a-h and the connection media 32 define a plurality of communication paths between the devices 24a-d that are communicatively coupled to the network 22. For example, a route 34 defines a communication path from device 24a to device 24d. If there is a disruption along the route 34 inhibiting communication of the data packets from the device 24a to the device 24d, for example, if one or more nodes are at capacity or have become disabled or there is a disruption in the connection media joining the nodes along route 34, a new route, illustrated as route 36, can be used. The route 36 may be dynamically generated or previously defined as a possible communication path, to ensure the communication between device 24a and device 24d.

Figure 3:
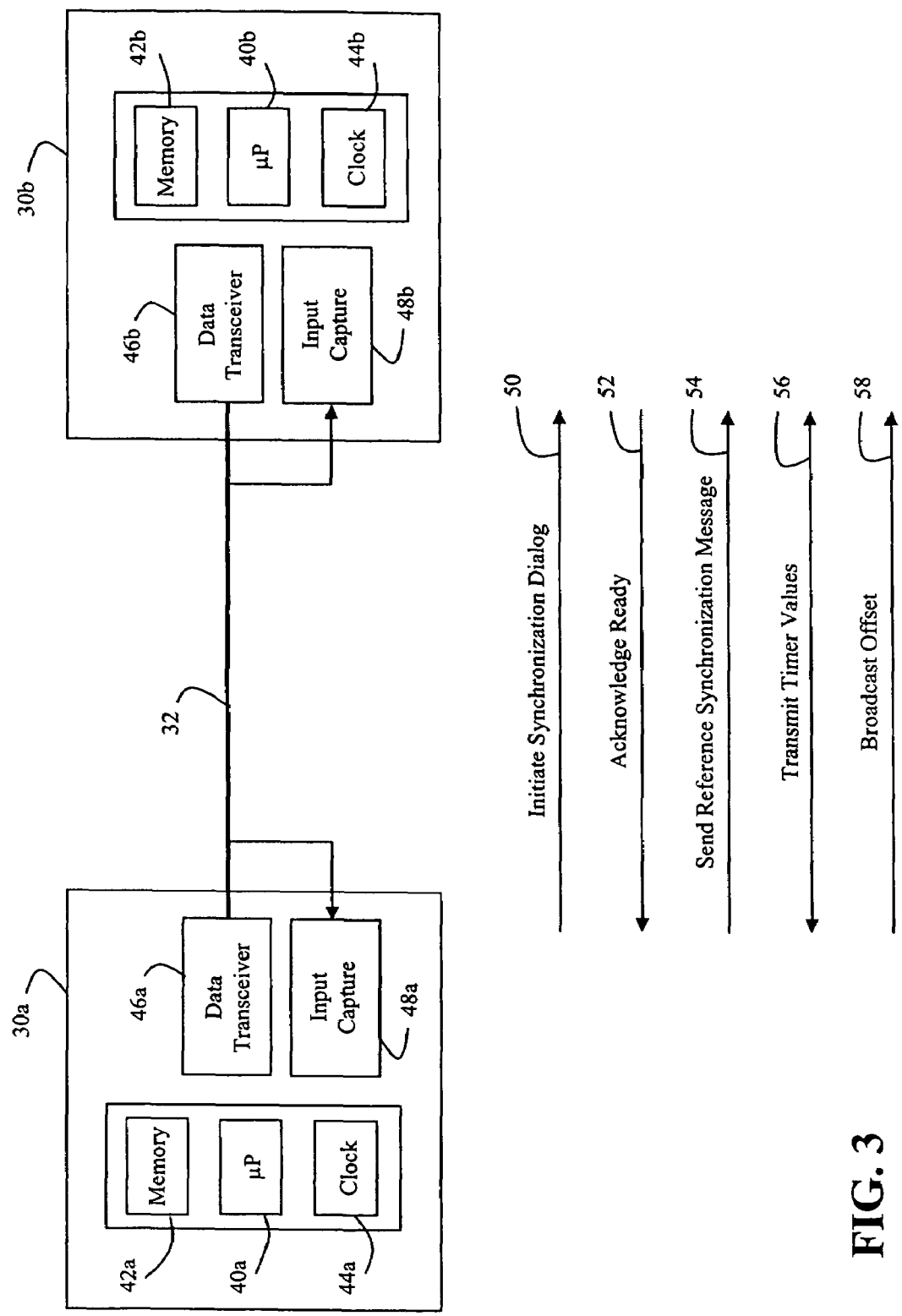
FIG. 3 is a graphic illustration of a portion of the vehicle active network illustrating the exchange of messages between two nodes.

Some applications may require synchronized activity between multiple elements of the network or devices connected to the network. This synchronized activity requires timing information be available within the network 22. FIG. 3 illustrates a portion of the network 22 that includes a switch fabric 28 of nodes, including a first node 30a and a second node 30b. Connection media 32 interconnects the first node 30a to the second node 30b.

As shown in FIG. 3, in one embodiment, the first node 30a and the second node 30b may include a microprocessor 40a, b, a memory 42a,b, a clock 44a,b, a data transceiver 46a,b to transmit and send data, and an input capture 48a,b function. The microprocessor 40a,b includes a suitable control program for effecting the operation of the node 30a,b for coupling inputs and outputs in order to transmit data within the network 22. Moreover, the microprocessor 40a,b may be configured to effect the operation of the synchronization dialogue in conjunction with the data transceiver 46a,b and the input capture 48a,b, as will be explained in further detail below.

FIG. 3 also illustrates, at a high level, one embodiment of the present invention for generating and providing synchronization information within the network 22. The process begins by the first node 30a initiating a synchronization dialogue with the second node 30b (arrow 50). The synchronization dialogue will prompt the input captures 48a,b on each node to arm. The second node 30b will respond with an acknowledgement ready message that it is ready to proceed with the synchronization dialogue (arrow 52). The first node 30a will then send a reference synchronization message to the second node 30b (arrow 54). The input capture 48a,b mechanisms on each node 30a,b will respectively capture a timestamp that will represent the time that the synchronization message left the first node 30 and a timestamp that will represent the time that the synchronization message was received at the second node 30b. The respective timestamps at each node 30a,b are shared with each other (arrow 56). Each node 30a,b will then calculate a timer offset value between the two nodes and store the offset value in an offset table or database. Later, each node 30a,b may broadcast the timer offset values that it calculated with neighboring other nodes to the entire network 22 (arrow 58).

Figure 4A:
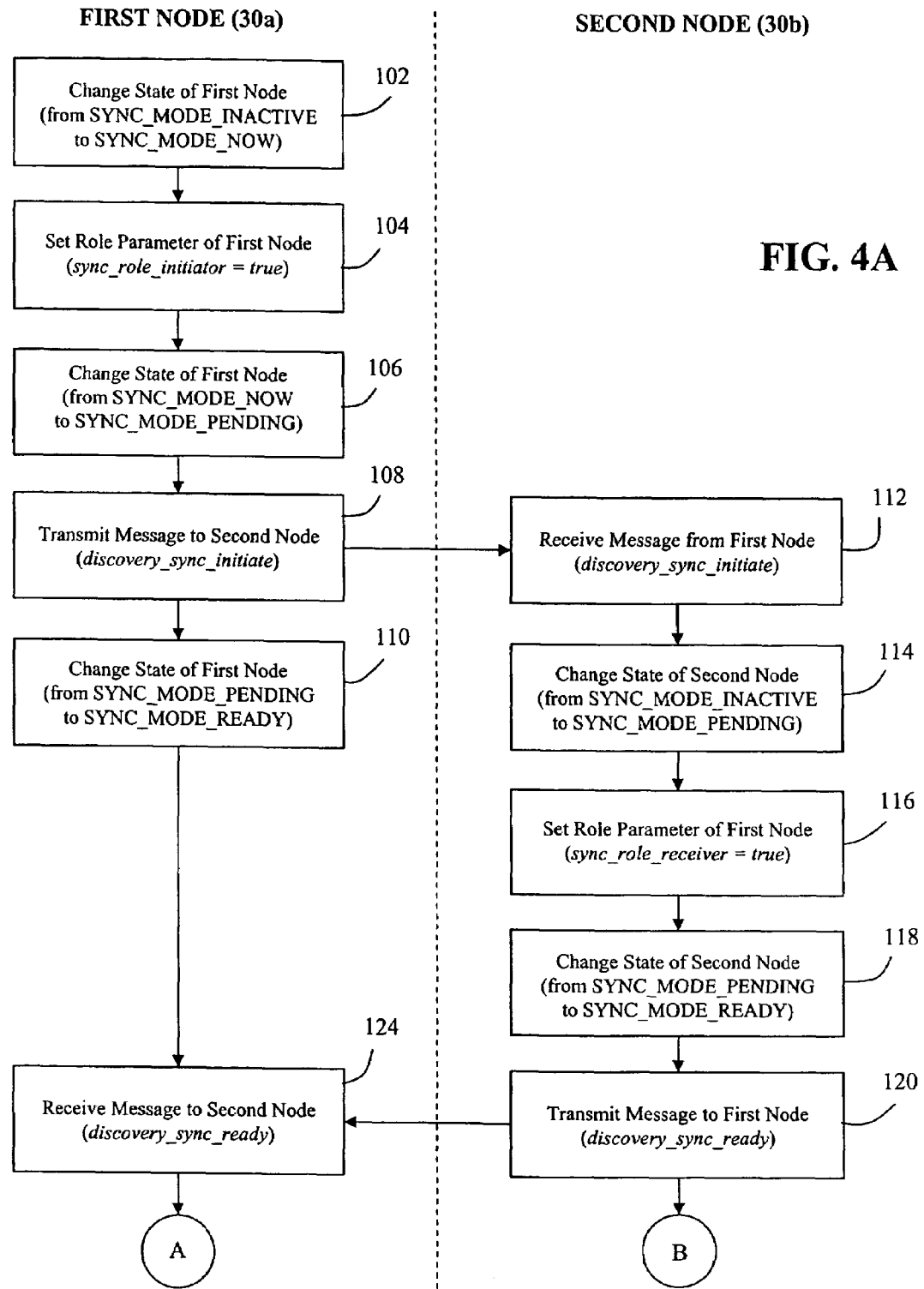

FIGS. 4A-4C further explains, at a more detailed level, one embodiment of the present invention for providing synchronization information within the network 22. Synchronization in this case is a process used by the nodes to calculate the relative clock offset between themselves and other neighboring nodes in the network 22. The flow diagrams in FIGS. 4A-4C contain further descriptions of one embodiment for implementing the functions to calculate neighboring offsets by a node. For purposes of illustration, these diagrams represent a synchronization dialogue between the first node 30a and the second node 30b.

Referring initially to FIG. 4A, the first node 30a and the second node 30b may operate within a plurality of states and roles. In this example, the roles are defined as an initiator and a receiver. Depending on the pre-defined role of the node, the node may function differently depending on the state of the node. This allows the nodes to have a common software platform but perform different functions and roles during the synchronization dialogue process.

In one embodiment, upon startup and during normal operation of the network 22, the first node 30a and the second node 30b will enter and remain in a state called SYNC_MODE_INACTIVE. When a node (such as the first node 30a) needs to enter into a synchronization dialogue with a neighboring node (such as the second node 30b), the node will exit the SYNC_MODE_INACTIVE state and begin traversing through a series of states that will walk the node through the synchronization dialogue process. When a node exits the SYNC_MODE_INACTIVE state, all outgoing messages not related to synchronization are held in an outgoing software buffer and not transmitted until the node re-enters the SYNC_MODE_INACTIVE state. As shown in box 102 of FIG. 4A, in one embodiment where a node wants to be an initiator (such as the first node 30a), the node may enter a SYNC_MODE_NOW state.

In this case, the SYNC_MODE_NOW state allows the first node 30a to designate its role as the initiator of the synchronization dialogue. Accordingly, in one embodiment, the first node 30a may set a role parameter (sync_role_initiator=true) as shown in box 104. The first node 30a may then transition to a SYNC_MODE_PENDING state as shown in box 106.

When the first node 30a is in the SYNC_MODE_PENDING state (and designated as the initiator), it may then perform a series of tasks including transmitting a message to the neighboring second node 30b. This is shown in box 108 of FIG. 4A where the first node 30a transmits an initial synchronization message (discovery_sync_initiate) to the second node 30b. The initial synchronization message may include fields such as a priority of the message and an identification of the first node 30a. After transmitting the initial synchronization message to the second node 30b, the first node 30a may then transition from the SYNC_MODE_PENDING state to the SYNC_MODE_READY state as shown in box 110.

As illustrated in box 112 of FIG. 4A, the second node 30b will receive the initial synchronization message from the first node 30a. When the second node 30b receives the initial synchronization message, the second node 30b will then exit the SYNC_MODE_INACTIVE state and enter the SYNC_MODE_PENDING state as shown in box 114. The second node 30b will then check to see if its role had been previously set to an initiator. Since the second node 30b did not transition through the SYNC_MODE_NOW state (like the first node 30a described above), the second node 30b will default to set its role to a receiver. Accordingly, in one embodiment, the second node 30b may set a role parameter (sync_role_receiver=true) as shown in box 116. The second node 30b may then transition from the SYNC_MODE_PENDING state to the SYNC_MODE_READY state as shown in box 118.

When the second node 30b is in the SYNC_MODE_READY state (and designated as the receiver), it may then perform a series tasks including transmitting a message to the initiating first node 30a. This is shown in box 120 of FIG. 4A where the second node 30b transmits an acknowledge ready message (discovery_sync_ready) to the first node 30a. After transmitting the acknowledge ready message to the first node 30a, the second node 30b may then transition from the SYNC_MODE_READY state to the SYNC_MODE_ARMED state as shown in box 122 (FIG. 4B).

As illustrated in box 124 of FIG. 4A, the first node 30a will receive the acknowledge ready message from the second node 30b. When the first node 30a receives the acknowledge ready message, the first node 30a may then exit the SYNC_MODE_READY state and enter the SYNC_MODE_ARMED state as shown in box 126. As illustrated in boxes 128, 130 of FIG. 4B, when the first node 30a and the second node 30b are in the SYNC_MODE_ARMED states, the nodes will arm their respective input captures 48a,b (the input captures are shown in FIG. 3). This will enable the nodes to capture a timestamp associated with the transmission of a reference synchronization message over the communication link 32, as explained further below.

When the first node 30a is in the SYNC_MODE_ARMED state (and designated as the initiator), it may then perform a series of tasks including transmitting a reference synchronization message to the neighboring second node 30b. This is shown in box 132 of FIG. 4B where the first node 30a transmits a reference synchronization message (discovery_sync) to the second node 30b. During the transmission of the reference synchronization message, in box 134, from its input capture 48a, the first node 30a will store a value of a timestamp from its clock 44a in memory 42a (the input capture, clock, and memory are shown in FIG. 3). After storing the timestamp value in memory 42a, the first node 30a may then transition from the SYNC_MODE_ARMED state to the SYNC_MODE_POST state as shown in box 136.

As illustrated in box 140 of FIG. 4B, when the reference synchronization message is transmitted, the input capture 48b of the second node 30b will store a value of a timestamp from its clock 44b in memory 42b. The capture may be on the edge of the bus transition when the message is sent. After storing the timestamp value in memory 42b, the second node 30b may then transition from the SYNC_MODE_ARMED state to the SYNC_MODE_POST state as shown in box 142.

When the second node 30b is in the SYNC_MODE_POST state (and designated as the receiver), it may then perform a series of tasks including transmitting a synchronization post message to the initiating first node 30a. This is shown in box 144 of FIG. 4B where the second node 30b transmits a synchronization post message (discovery_sync_post) to the first node 30a. The synchronization post message may include fields such as the timestamp value captured in memory 42b associated with the transmission of the reference synchronization message. After transmitting the synchronization post message to the first node 30a, the second node 30b may then transition from the SYNC_MODE_POST state to the SYNC_MODE_COMPLETE state as shown in box 146.

As illustrated in box 148 of FIG. 4B, the first node 30a will receive the synchronization post message from the second node 30b. When the first node 30a receives the synchronization post message, the first node 30a may then exit the SYNC_MODE_POST state and enter the SYNC_MODE_COMPLETE state as shown in box 150. As illustrated in FIG. 4C, when the first node 30a is in the SYNC_MODE_COMPLETE state, the first node 30a may then perform a series of tasks including computing an offset value and storing the offset value in an offset table in its memory 42a. With reference to box 152 in FIG. 4C, the first node 30a may compute the offset value based on the difference in time between the input capture value stored in its memory with the input capture value received from the second node 30b in the synchronization post message. The first node 30a may then store the computed offset in its memory 42a as illustrated in box 154.

In a further embodiment, the first node 30a may then transmit a synchronization complete message to the neighboring second node 30b. This is shown in box 156 of FIG. 4C where the first node 30a transmits a synchronization complete message (discovery_sync_complete) to the second node 30b. In one embodiment, the synchronization complete message may include fields such as the timestamp value stored in memory 42a associated with the transmission of the reference synchronization message. In another embodiment, the synchronization complete message may include the offset value computed by the first node 30a. After transmitting the synchronization complete message to the second node 30b, the first node 30a may then reset all variables and transition from the SYNC_MODE_COMPLETE state to the SYNC_MODE_INACTIVE state as shown inbox 158.

As illustrated in box 160 of FIG. 4C, the second node 30b will receive the synchronization complete message from the first node 30a. If the synchronization complete message includes the timestamp value associated with the transmission of the reference synchronization message, then the second node 30b may then perform additional tasks such as computing an offset value and storing the offset value in an offset table in its memory 42b. With reference to box 162 in FIG. 4C, the second node 30b may compute the offset value based on the difference in time between the input capture value stored in its memory with the input capture value received from the first node 30a in the synchronization complete message. The second node 30b may then store the computed offset in its memory 42b as illustrated in box 164. After storing the computed offset in the second node 30b, the second node 30b may then reset all variables and transition from the SYNC_MODE_COMPLETE state to the SYNC_MODE_INACTIVE state as shown in box 166.

In a further embodiment, the first node 30a may then proceed to do a similar process with any other immediate neighboring nodes. The first node 30a will store in its memory each computed offset with its immediate neighboring nodes. The first node 30a may then further be configured to broadcast its stored offsets with each node 30b-h in the network 22. Each node in the network 22 may then retain the timer offsets discovered by other nodes in the network 22. In one embodiment, as illustrated in FIG. 5, each node 30a-h may maintain an offset table 70 in memory that represents the offsets that it has computed on its own as well as any offsets that it has received from other nodes.

Figures 5, 6:
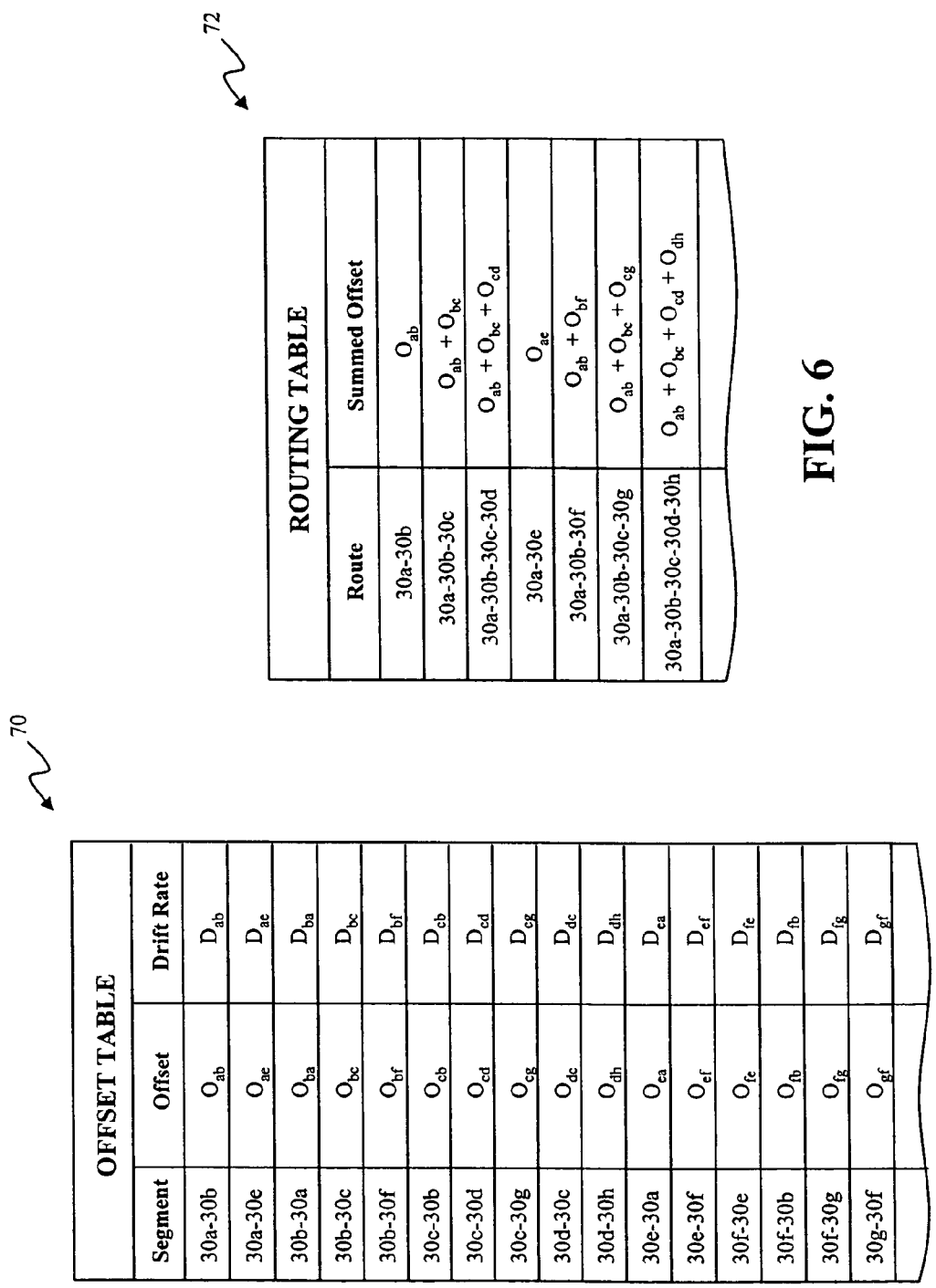
FIG. 5 is a graphic illustration of an offset table that may be stored in a node of the vehicle active network.
FIG. 6 is a graphic illustration of a routing table that may be stored in a node of the vehicle active network.

The benefit of the offset table 70 as illustrated in FIG. 5, is that a node may further compute or calculate a clock offset between itself and any other node on the network 22. As shown in FIG. 6, this can be done by summing the individual offsets of node segments stored in its offset table 70 along a particular communication path. For instance, referring to FIG. 2, if node 30a desires to know the timing offset between node 30a and 30g (along path 34), the node will use the offsets computed and received between the communication links of 30a-30b, 30b-30c, and 30c-30g.

Moreover, as shown in FIG. 5, as offsets are periodically recalculated and re-broadcast within the network 22, the nodes 30a-h may be configured to infer or determine an acceleration or drift rate of remote clocks over time. The acceleration or drift rate may be computed by determining the difference between computed or received offsets over the difference in time between synchronization dialogs. Using inferred acceleration and drifts of clocks can improve accuracy between synchronization dialogues. It also allows the system to use less accurate crystals or ceramic resonators to reduce costs. It further allows the system to wait for longer periods between synchronization dialogues.

What has been described is a system and method for time synchronizing nodes in a switch fabric network for a vehicle. A series of messages are exchanged that will begin a synchronization dialogue and, through the dialogue, a set of input captures on each node will arm. The input captures are connected to the bus and capture a set of timestamps on each node from a reference synchronization message transmitted during the dialogue. The timestamps are shared between nodes so that the nodes can calculate a timer offset value for each immediate neighbor. The timer offset values may then be shared with other nodes in the network so that a summed offset may be used to transmit network messages across a plurality of nodes. The above description of the present invention is intended to be exemplary only and is not intended to limit the scope of any patent issuing from this application. The present invention is intended to be limited only by the scope and spirit of the following claims.

What is claimed is:

1. A method for time synchronizing nodes in a switch fabric of a vehicle communication network, the nodes in the switch fabric joined by communication links for the transmission of data packets there between, the method comprising the steps of:

transmitting an initial synchronization message from a first node to a second node;

transmitting an acknowledge ready message from the second node to the first node;

transmitting a reference synchronization message from the first node to the second node;

capturing a first timestamp associated with the reference synchronization message at the first node and a second timestamp associated with the reference synchronization message at the second node;

transmitting the second timestamp from the second node to the first node;

computing an offset in the first node based on the first timestamp captured at the first node and the second timestamp transmitted from the second node; and storing the offset in the first node for subsequent use in time synchronizing data packets transmitted by the first node to other nodes in the switch fabric.

2. The method in claim 1 further comprising the step of transmitting the first timestamp from the first node to the second node and computing a second offset in the second node based on the second timestamp captured at the second node and the first timestamp transmitted from the first node.

3. The method in claim 1 further comprising the step of transmitting the computed offset from the first node to other nodes in the switch fabric.

4. The method in claim 2 further comprising the step of transmitting the computed second offset from the second node to other nodes in the switch fabric.

5. The method in claim 1, wherein the step of storing the offset includes storing the offset in an offset table, the offset table including a listing of a plurality of offsets of different communication segments between nodes in the switch fabric.

6. The method in claim 1 further comprising the step of receiving an offset at the first node from a third node in the switch fabric, the offset received from the third node being associated with a communication link between the third node and a fourth node.

7. The method in claim 6 further comprising the step of determining a drift rate associated with the third node based on the offset received from the third node.

8. The method in claim 1 wherein the recited steps are performed during a first time and a second time to compute a first offset and a second offset, the method further comprising the step of determining a drift rate based on the first and second offsets and the first and second times.

9. A method for time synchronizing a switch fabric of a vehicle communication network, the switch fabric having at least a first node and a second node, the first node and the second node joined by a communication link for the transmission of data packets there between, the method comprising the steps of:

initiating a synchronization dialogue between the first node and the second node;

designating the first node as the initiator of the synchronization dialogue and the second node as the receiver of the synchronization dialogue;

transmitting a synchronization message from the first node to the second node;

capturing a first timestamp associated with the reference synchronization message at the first node and a second timestamp associated with the reference synchronization message at the second node;

transmitting the second timestamp from the second node to the first node;

computing an offset in the first node based on the first timestamp captured at the first node and the second timestamp transmitted from the second node.

10. The method in claim 9 further comprising the step of storing the offset in the first node for subsequent use in time synchronizing data packets transmitted by the first node to another node along a communication path that includes the second node.

11. The method in claim 9 further comprising the step of transmitting the first timestamp from the first node to the second node and computing a second offset in the second node based on the second timestamp captured at the second node and the first timestamp transmitted from the first node.

12. The method in claim 11 further comprising the step of storing the second offset in the second node for subsequent use in time synchronizing data packets transmitted by the second node to another node along a communication path that includes the first node.

13. The method in claim 9 wherein the switch fabric includes a third node, the method further comprising the step of transmitting the computed offset from the first node to the third node in the switch fabric.

14. The method in claim 11 wherein the switch fabric includes a third node, the method further comprising the step of transmitting the computed second offset from the second node to the third node in the switch fabric.

15. The method in claim 10, wherein the step of storing the offset in the first node includes storing the offset in an offset table, the offset table including a listing of a plurality of offsets of different communication segments between different nodes in the switch fabric.

16. The method in claim 9 wherein the switch fabric includes a third node and a fourth node, the method further comprising the step of receiving an offset at the first node from the third node, the offset received from the third node being associated with a communication link between the third node and the fourth node.

17. The method in claim 16 further comprising the step of determining in a first node a drift rate associated with the third node based on the offset received from the third node.

18. The method in claim 9 wherein the recited steps are performed during a first time and a second time to compute a first offset and a second offset, the method further comprising the step of determining a drift rate based on the first and second offsets and the first and second times.

19. A vehicle network comprising:

a plurality of nodes joined by communication links for the transmission of data there between;

each node of the vehicle network including a processor, a memory, and a clock, the memory adapted to store and retain a timer offset associated with a communication link between the node and a neighboring node;

a transceiver disposed within each node, the transceiver being adapted to transmit synchronization messages to the neighboring node in the vehicle network when the node is an initiator of a synchronization dialogue and being adapted to receive synchronization messages from the neighboring node in the vehicle network when the node is not the initiator of the synchronization dialogue; and an input capture to capture a timestamp associated with the transmission of synchronization messages when the node is an initiator of the synchronization dialogue and a timestamp associated with the transmission of synchronization messages by the neighboring node when the node is not an initiator of the synchronization dialogue;

wherein the processor is operable to compute the timer offset based on the timestamp captured by the input capture and a neighboring timestamp received from the neighboring node.

20. The vehicle network in claim 19, wherein the transceiver is further adapted to transmit an initial synchronization message to the neighboring node and adapted to receive an acknowledge ready message from the neighboring node when it is the initiator of a synchronization dialogue.

21. The vehicle network in claim 20, wherein the transceiver is further adapted to transmit a reference synchronization message upon receipt of the acknowledge ready message from the neighboring node and adapted to receive the neighboring timestamp from the neighboring node.

22. The vehicle network in claim 19, wherein the transceiver is further adapted to transmit the timer offset to other nodes in the vehicle network.

* * * * *

UNITED STATES PATENT AND TRADEMARK OFFICE
CERTIFICATE OF CORRECTION

PATENT NO. : 7,593,429 B2  Page 1 of 1
APPLICATION NO. : 11/014936
DATED : September 22, 2009
INVENTOR(S) : Jordan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Twenty-first Day of September, 2010

David J. Kappos
*Director of the United States Patent and Trademark Office*